(12) United States Patent
Tse et al.

(10) Patent No.: US 6,292,099 B1
(45) Date of Patent: Sep. 18, 2001

(54) EVENT MANAGEMENT SYSTEM UTILIZING DYNAMIC ADAPTATION FOR EXTERNAL DEVICES

(75) Inventors: Edwin Tse, Montreal (CA); David O'Flanagan, Dublin; Fergus Kelledy, Louth, both of (IE); Nicolas Gosselin, Blainville (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/400,345

(22) Filed: Sep. 20, 1999

(51) Int. Cl.$^7$ .................................................. G08B 29/00
(52) U.S. Cl. .................. 340/506; 340/825.06; 702/188; 700/80
(58) Field of Search ............................. 340/506, 825.06; 702/187, 188; 700/80

(56) References Cited

U.S. PATENT DOCUMENTS

| | | | |
|---|---|---|---|
| 5,381,470 | 1/1995 | Cambray et al. | 379/216 |
| 5,400,246 | * 3/1995 | Wilson et al. | 340/825.06 X |
| 5,621,892 | 4/1997 | Cook | 395/200.1 |
| 5,655,081 | 8/1997 | Bonnell et al. | 395/200.32 |
| 5,872,931 | 2/1999 | Chivaluri | 395/200.53 |
| 5,892,898 | 4/1999 | Fujii et al. | 395/185.1 |
| 5,944,782 | 8/1999 | Noble et al. | 709/202 |

FOREIGN PATENT DOCUMENTS

WO 95/08794    3/1995   (WO).

* cited by examiner

Primary Examiner—Daryl Pope
(74) Attorney, Agent, or Firm—Smith, Danamraj & Youst, P.C.

(57) ABSTRACT

An Event Management System (EMS) for logging and correlating alarm events in a network, and a method of efficiently integrating the EMS, which communicates in a standard format, with external devices and external viewers which communicate in device-specific formats. A plurality of core EMS components which log and correlate events are functionally separated from a plurality of EMS boundary components which interact with external devices and external viewers. The boundary components perform both generic external interface functions and device-specific functions. An external device's information, including a class and location for a protocol handler and a content handler for the external device, is stored in an information repository associated with the EMS. When a connection is initiated from the external device to one of the boundary components, the boundary component obtains the external device information from the information repository. The boundary component then remotely loads the protocol handler class and the content handler class, instantiates the protocol handler class and the content handler class, and connects the protocol handler class and the content handler class to the external device to convert information in the device's device-specific format to information in the standard format utilized by the EMS.

5 Claims, 5 Drawing Sheets

EVENT MANAGEMENT SYSTEM UTILIZING DYNAMIC ADAPTATION FOR EXTERNAL DEVICES

BACKGROUND OF THE INVENTION

1. Technical Field of the Invention

This invention relates to Event Management Systems (EMSs) and, more particularly, to a method of dynamically adapting an EMS to interface with external devices.

2. Description of Related Art

An Event Management System (EMS), or more specifically an alarm management system, is a surveillance system commonly used to monitor networks such as telecommunications networks, utility networks, fleet (vehicle) location systems, and property (building) intrusion systems, among others. Elements under surveillance, such as a computer, a switch, a particular network path or route, a port, or a trap door are monitored for events or fault conditions. Once detected, an event or alarm is sent towards a central location for display, logging, and/or event correlation. The EMS is typically required to interface with a wide variety of external devices, each of which may have its own proprietary communications protocol and content type. A number of viewing devices capable of displaying specific event formats from various external devices emitting events may also be required.

With the current state of the art, EMS developers are required to create numerous device handlers capable of handling specific classes of external devices that use specific protocols and specific event formats, and to integrate the device handlers with the core EMS. In addition, numerous viewing device handlers capable of displaying specific event formats must be created. Adapting the core EMS to interface with a variety of external devices and viewing devices is a non-trivial and time-consuming task. There are potentially very large numbers of external devices (and their corresponding viewing devices) with which an EMS may be required to interface, each of which requires time and effort by the EMS developer to develop an interface. Thus, implementation of these handlers in the core EMS requires significant effort by the EMS developer and places responsibility for integrating the EMS with external devices and viewing devices firmly on the shoulders of the EMS developer.

Upgrades to viewers (displays) are also a concern. Existing users find it advantageous to continue to use the same viewer to view events from newly added external devices, rather than having a separate viewer for each external device. In one proposed solution, whenever a new class of external devices is added to the EMS, all viewers are upgraded to include new algorithms for display of new event formats associated with the new external devices. However, the distribution of new versions of viewers to users who may not be interested in receiving events from the newly added class of external devices is expensive and wasteful. In addition, the accumulation of new display algorithms to accommodate the ever expanding list of new external device classes makes the viewer footprint too large, and is not suitable to support the thin-client concept, a requirement for a WEB-enabled environment.

Although there are no known prior art teachings of a solution to the aforementioned deficiency and shortcoming such as that disclosed herein, PCT Patent Application WO 95/08794 by Gilbert et al. (Gilbert) discusses subject matter that bears some relation to matters discussed herein. Gilbert discloses a management system that allows for the separation between a logical, external view of a network manager and a physical, internal view of a communication device installed in the network. A management agent is implemented in the communication device for each network manager with which the device interfaces. A data model in a relational database allows the management agent, on behalf of the network manager and the communication device's configuration managers, to map each other's specific data to a normalized view of the communication device. This manager/agent system is adaptable to the communication device's changing requirements and complex data modeling environment.

However, Gilbert requires the implementation of a management agent in the communication device for each network manager with which the device interfaces. In addition, the management agent must be made to interface with the relational database. The requirement to implement an agent for each network manager is a time-consuming task which requires significant effort by the developer.

Review of the foregoing reference reveals no disclosure or suggestion of a system or method such as that described and claimed herein. In order to overcome the disadvantage of existing solutions, it would be advantageous to have an Event Management System (EMS) for logging and correlating alarm events in a network, and a method of efficiently and dynamically integrating the EMS with external devices and external viewers.

SUMMARY OF THE INVENTION

In one aspect, the present invention is an Event Management System (EMS) which logs and correlates alarm events in a network, and which efficiently integrates with external devices and external viewers. The EMS comprises a plurality of core EMS components which log and correlate events, and a plurality of EMS boundary components functionally separated from the core EMS components. The boundary components interact with external devices and external viewers, and include components which perform generic external interface functions, and components which perform device-specific functions.

In another aspect, the present invention is a method of efficiently interfacing an EMS which communicates in a standard format with an external device which communicates in a device-specific format. The method includes the steps of functionally separating core EMS components, which log and correlate events, from EMS boundary components, which interact with the external device. External device information, including a class and location for a protocol handler and a content handler for the external device, is stored in an information repository associated with the EMS. When a connection is initiated from the external device to one of the boundary components, the boundary component obtains the external device information from the information repository. The boundary component then remotely loads the protocol handler class and the content handler class, instantiates the protocol handler class and the content handler class, and connects the protocol handler class and the content handler class to the external device to convert information in the device's device-specific format to information in the standard format utilized by the EMS.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is an Event Management System (EMS) which is configured to efficiently and dynamically integrate with a wide range of external devices. The present invention isolates the core EMS from the problems associated with the integration of the EMS with external devices and viewers.

Figure 1:
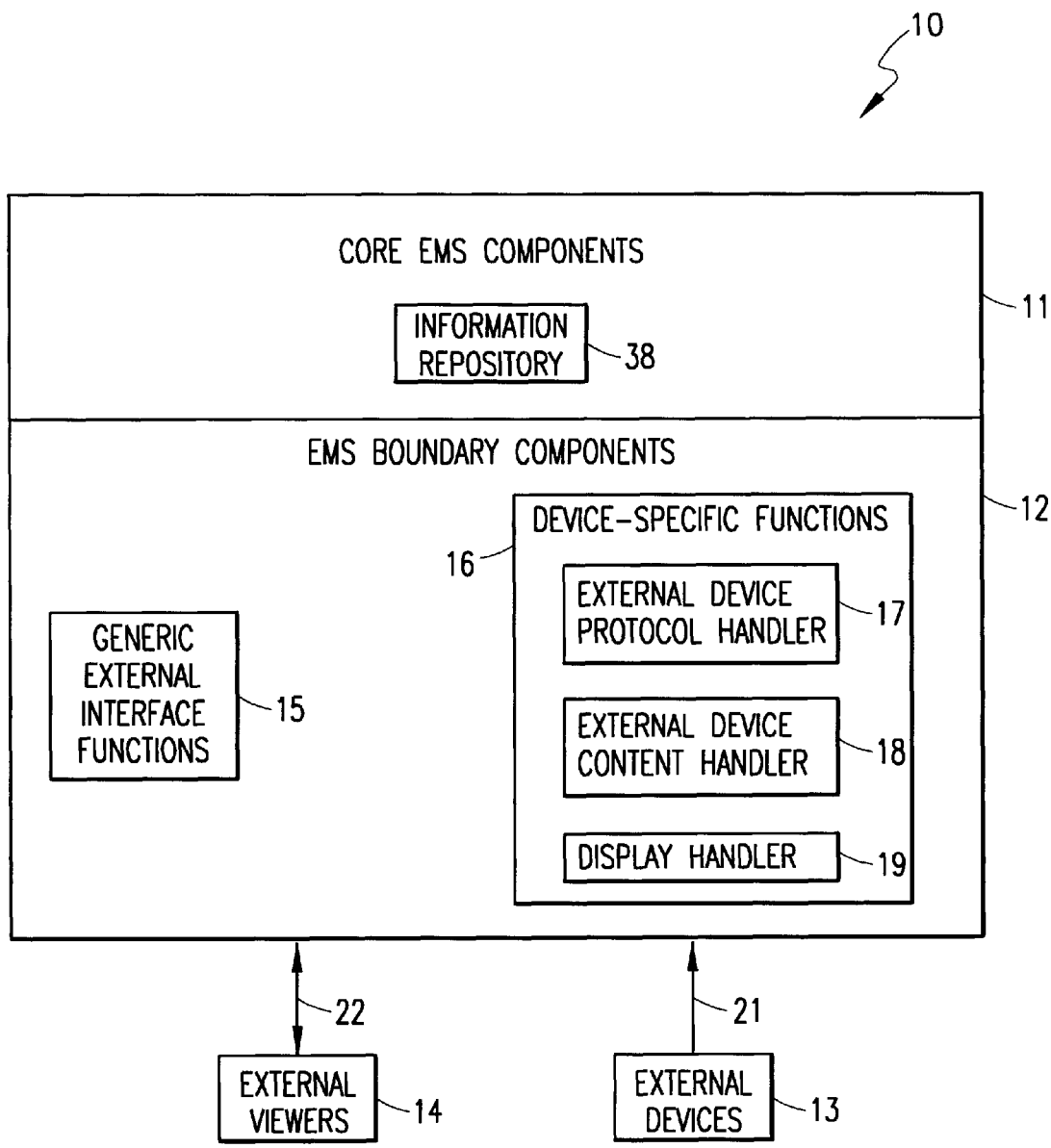
FIG. 1 is a simplified functional block diagram of the preferred embodiment of the Event Management System (EMS) of the present invention.

FIG. 1 is a simplified functional block diagram of the preferred embodiment of the Event Management System (EMS) 10 of the present invention. The EMS is divided into two main portions, core EMS components 11 which log and correlate events, and EMS boundary components 12 which interact with external devices 13 and external viewers 14. The external devices 13 are connected to the EMS 10 through third-party protocol and content handlers 21. The external viewers 14 are connected to the EMS through third-party display handlers 22. The core EMS components include an information repository (database) 38 to hold class and location information for device-specific protocol handlers and content handlers. The repository also holds display handler class and location information needed to display events emitted by specific device classes. The EMS boundary components 12 are partitioned into two parts: a generic external interface part 15 containing all the generic functionality applicable to handling of all external devices, and a device-specific part 16 containing functions applicable to handling of specific external device and viewer types. The device-specific functions are typically broken up into three distinct parts: an external device protocol handler 17, an external device content handler 18, and a display handler 19. Thus, the EMS 10 provides boundary components with generic device handler and generic viewer functionality that are capable of hosting third-party, device-specific protocol handlers, content handlers, and display handlers.

The external device protocol handler 17, content handler 18, and display handler 19 need only be written once for each class of external device that emits events of a particular content type. For example, once a protocol handler is written for a particular class of external device, it may be reused for all external devices conforming to the same protocol. The same applies to the content handler; once it is written for a particular content type, it is reused for all external devices that supply information to the EMS in that format. The external device protocol handlers, content handlers, and display handlers are then used with a programming language such as Java, for example, to provide the EMS with the unique ability to perform dynamic class loading at runtime and automatically load the appropriate protocol handlers, content handlers, and display handlers.

Figure 2:
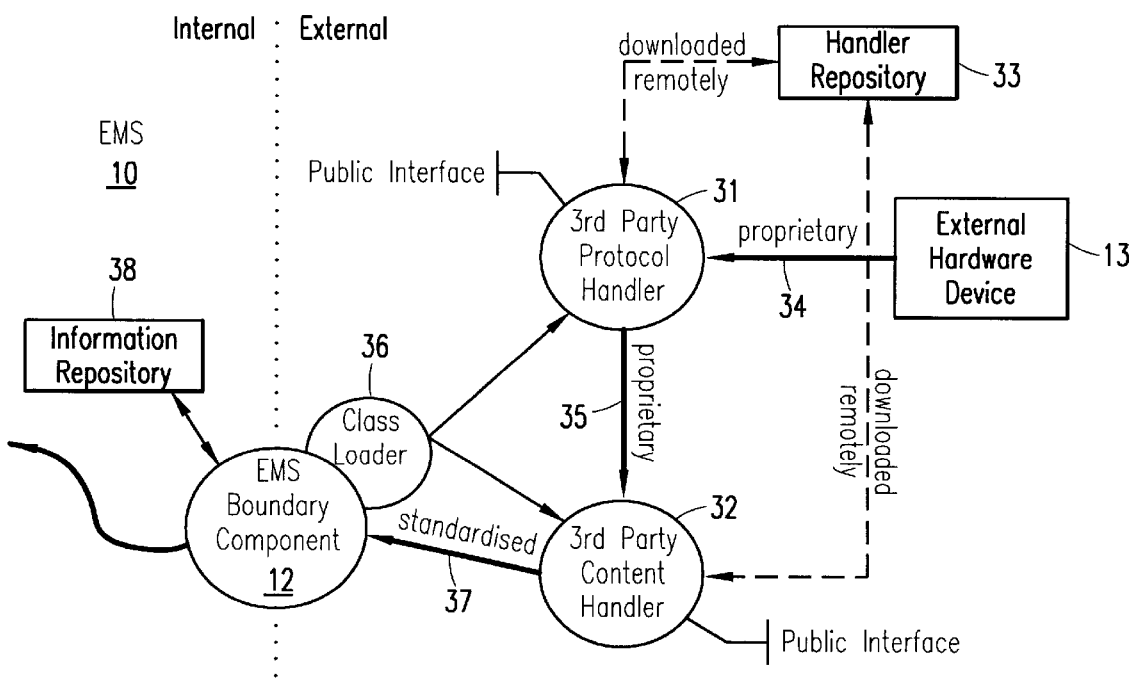
FIG. 2 is a simplified functional block diagram illustrating the interaction of third party protocol and content handlers with the EMS of the present invention.

FIG. 2 is a simplified functional block diagram illustrating the interaction of a third-party protocol handler 31 and a third-party content handler 32 with the EMS 10 of the present invention. The EMS information repository (database) 38 stores class and location information related to device-specific protocol handlers and content handlers. The repository also holds display handler information needed to display events emitted by specific device classes. The external hardware device 13 interfaces with the third-party protocol handler via a third-party proprietary interface 34. The protocol handler, in turn, interfaces with the third-party content handler via a third-party proprietary interface 35. After the boundary component obtains the classes and locations of the protocol handler and content handler from the information repository, a class loader 36 associated with the boundary component 12 is utilized to remotely load the protocol handler class and the content handler class at runtime. The boundary component 12 may remotely download the protocol handler 31 and the content handler 32 from a handler repository 33 which may be, for example, a Web server. Thereafter, the content handler interfaces with the EMS boundary component via a standardized interface 37.

Figure 3:
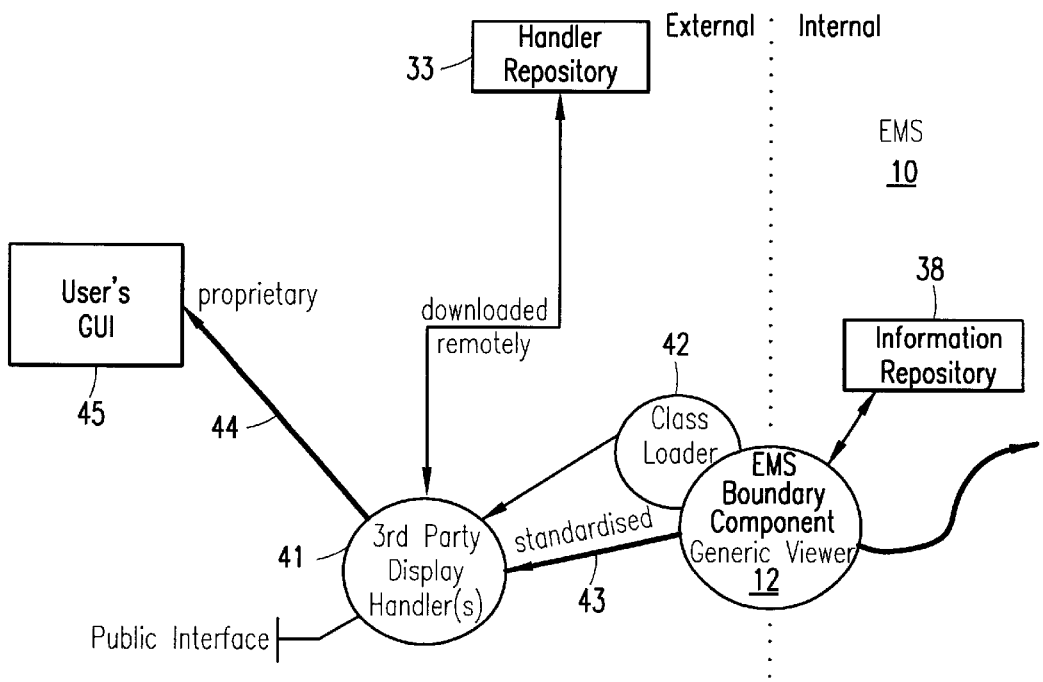
FIG. 3 is a simplified functional block diagram illustrating the interaction of third party display handlers with the EMS of the present invention.

FIG. 3 is a simplified functional block diagram illustrating the interaction of a third-party display handler 41 with the EMS 10 of the present invention. Basically, the same relationship exists between the EMS and the display handler as has been described for the protocol and content handlers. Generally, a generic display handler is instantiated and starts receiving information from the EMS. These events typically may be of a number of different content types.

The EMS information repository 38 holds information relating to the display handler class and location which is needed to display events emitted by specific device classes. The boundary component 12 retrieves the display handler information from the information repository and utilizes a class loader 42 to remotely load the display handler 41. The boundary component may remotely download the display handler 41 from the handler repository 33. The EMS boundary component 12 provides generic viewer information over a standardized interface 43 to the display handler. The third-party display handler then utilizes a proprietary interface 44 to interface with the user's graphical user interface (GUI) 45 where the event information is displayed.

Figure 4:
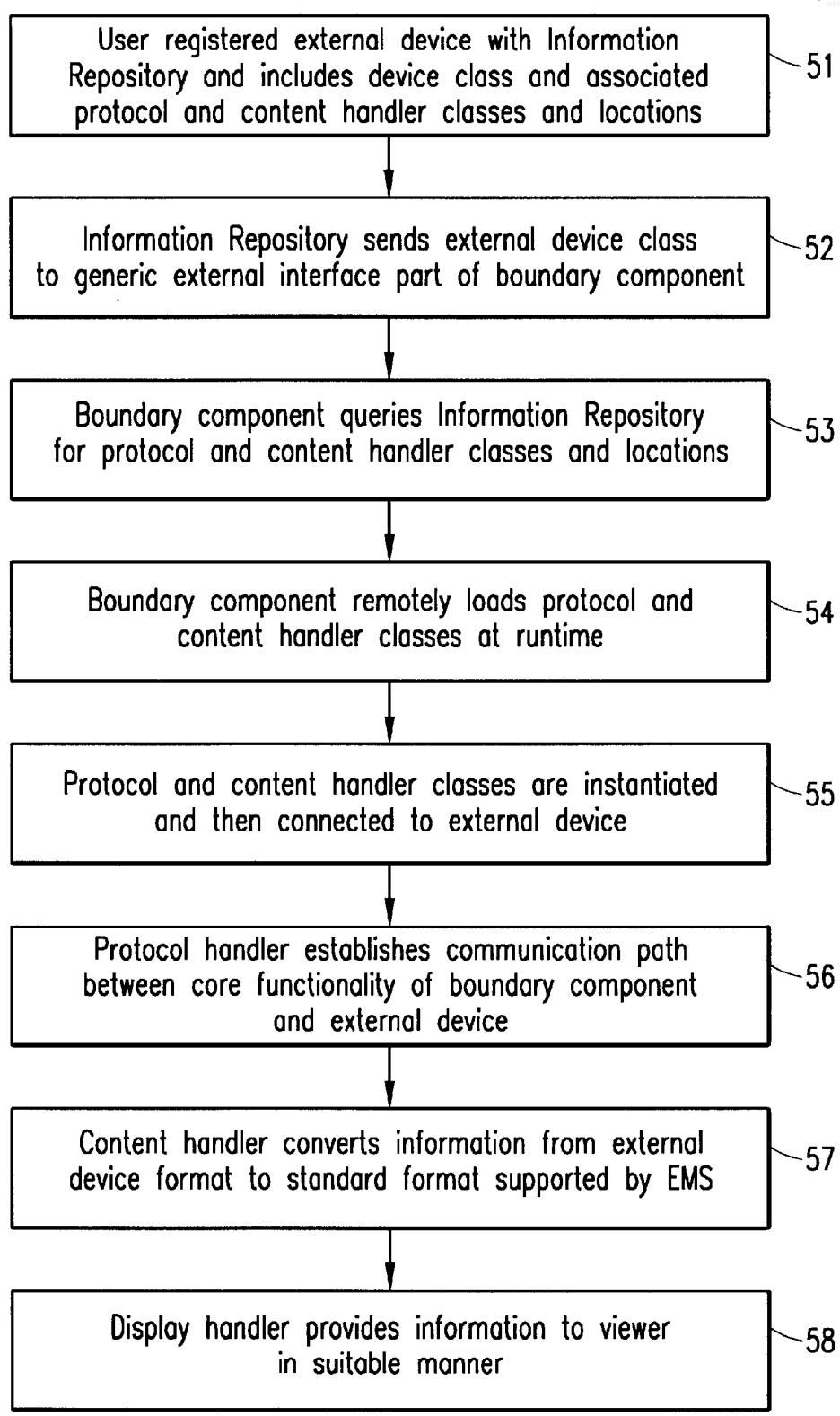
FIG. 4 is a flow chart of the steps involved in dynamic class loading at runtime with automatic loading of appropriate protocol handlers, content handlers, and display handlers according to the teachings of the present invention.

FIG. 4 is a flow chart of the steps involved in dynamic class loading at runtime with automatic loading of appropriate protocol handlers, content handlers, and display handlers according to the teachings of the present invention. The process begins at step 51 where a user of the EMS 10 wishing to connect a new external device 13 to the system, registers the external device with the information repository 38 associated with the EMS. The registration process involves storing in the information repository, the class of the device, the protocol handler and content handler which the device uses, and where to locate these handlers.

The generic external interface part 15 of the boundary component 12 is then instantiated (or reused from a boundary component installed previously) and informed of the class of external device to which it is being connected at 52. At step 53, the boundary component then queries the EMS's information repository to obtain the class and location information needed. Once the boundary component is given the classes and locations of the handlers it needs, the process moves to step 54 where the boundary component then remotely loads these classes at runtime. Once these handler classes are loaded, they are then instantiated at step 55 and connected to the new external device to convert and handle any information the device generates.

The conversion and handling of external device information begins at step 56 where the external device protocol handler 17 establishes a communications path between the core functionality of the boundary component 12 and the external device 13. At step 57, the content handler 18 converts information from the format provided by the external device to the standard format supported by the EMS. Finally, at step 58, the display handler 19 provides the content to the external viewer 14 in a suitable manner.

Figure 5:
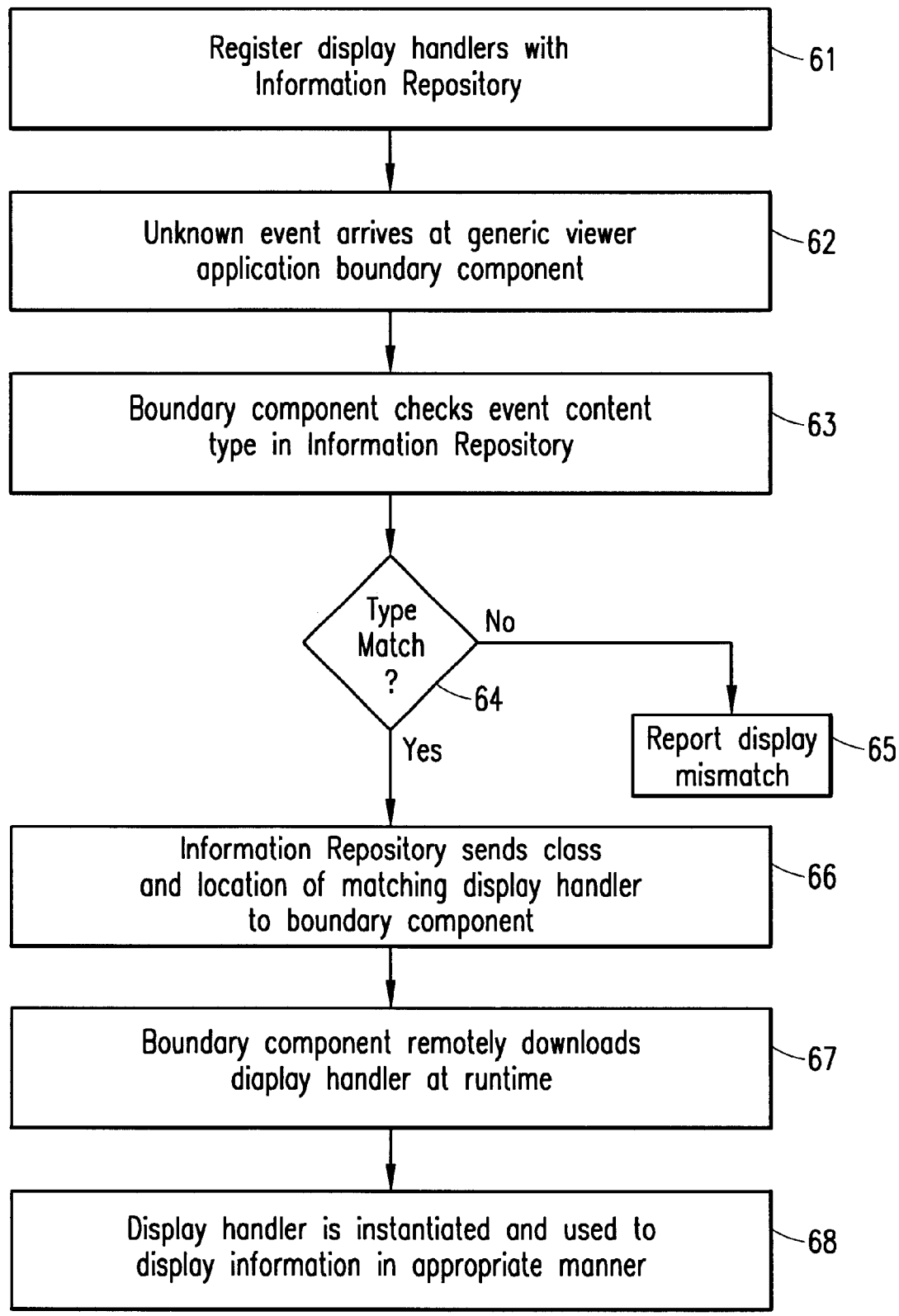
FIG. 5 is a flow chart of a first embodiment of a process of correctly displaying device-specific information by a generic viewer application.

The generic external interface part 15 of the boundary component 12 includes a generic viewer application, and there are two approaches which may be employed to correctly display device-specific information by the generic viewer application. The first approach, as illustrated in FIG. 5, begins at step 61 where the various display handlers are registered with the EMS's information repository 38. When an unknown event arrives at the generic viewer application at 62, the boundary component checks the event's content type in the information repository at step 63 to determine whether it matches any registered display handlers. Since there may be more than one way to display the same information, there may be more than one display handler per content type. It is determined at step 64 whether or not there is a matching display handler type for the event's content type. If not, a display mismatch is reported at step 65. If there is a match, the process moves to step 66 where the information repository sends the class and location of the matching display handler to the boundary component. At 67, the boundary component remotely downloads the appropriate display handler at runtime. The display handler is then instantiated and used at step 68 to display the information in the appropriate manner.

Figure 6:
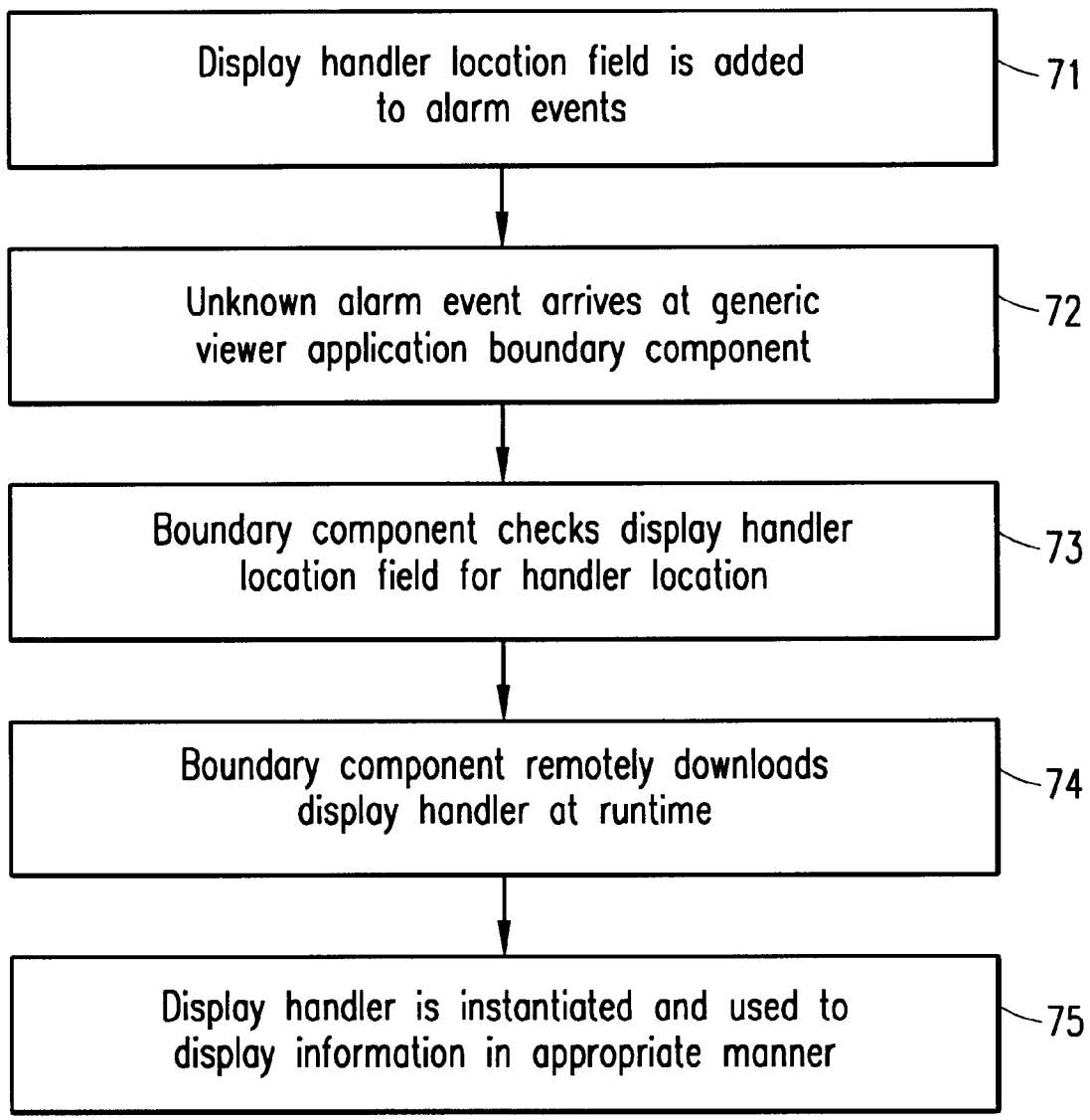
FIG. 6 is a flow chart of a second embodiment of the process of correctly displaying device-specific information by a generic viewer application.

The second and even more dynamic approach for correctly displaying device-specific information by the generic viewer application is illustrated in FIG. 6. In this approach, the event itself carries enough information to locate the display handler without the generic viewer application having to access the information repository to download the display handler classes. At step 71, an extra field is added to the event which includes the location of a display handler location able to display the event. At step 72, an unknown alarm event arrives at the generic viewer application in the boundary component. At step 73, the boundary component checks the display handler location field in the event to determine the location of the display handler. At 74, the boundary component remotely downloads the appropriate display handler at runtime. The display handler is then instantiated and used at step 75 to display the information in the appropriate manner.

Several benefits are provided by the system and method of the present invention. First, the present invention may be implemented in a manner that is totally transparent to the end user and transparent to the developer of the core event management components. Second, by isolating the core EMS components from the components communicating with external devices and displaying event content for events emitted by external devices, responsibilities for the design and maintenance of the EMS and the external devices can be assigned to different teams having specific and different competence. Therefore, development of the EMS and device-specific tasks can be performed in parallel. Third, with the present invention, new external device types may be introduced into an operating EMS without interrupting its continuous operation. When a device developer develops a device of a new class, a protocol handler, content handler, and display handler are also developed. The handler classes are then deposited in the appropriate information repository. When the external device is ready for interconnection, the developer requests the EMS administrator to instantiate a generic boundary device handler. Once the boundary device handler starts, it downloads the correct protocol and content handlers, and connects to the new device to accept events.

Fourth, no interruption or deployment of new display viewers are required, and existing viewers that are deployed and running, can display events properly when events emitted by the instance of the new device class are received. When the operating viewers receive events of the new types (from the new device), the viewers download the appropriate display handler to display the new content type. Additionally, it is possible to view information from multiple event sources within a single event viewer, and the viewing procedure may be customized through the development of proprietary display handlers. Finally, EMS customers can perform their own integration with the EMS without gaining access to the core EMS components.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A method of efficiently interfacing an Event Management System (EMS) which communicates in a standard format with an external device which communicates in a device-specific format, said method comprising the steps of:

functionally separating core EMS components, which log and correlate events, from a plurality of EMS boundary components, which interact with the external device;

storing, in an information repository associated with the EMS, external device information, said information including a class and location for a protocol handler and a content handler for the external device;

initiating a connection from the external device to one of the boundary components;

obtaining by the boundary component, the external device information from the information repository;

remotely loading by the boundary component, the protocol handler class and the content handler class obtained for the external device, from the identified location;

instantiating the protocol handler class and the content handler class;

connecting the instantiated protocol handler class and the instantiated content handler class to the external device to convert information in the device's device-specific format to information in the standard format utilized by the EMS.

2. The method of efficiently interfacing an EMS with an external device of claim 1 wherein the step of connecting the protocol handler class and the content handler class to the external device to convert information in the device's device-specific format to information in the standard format utilized by the EMS includes the steps of:

establishing a communications path between the boundary component and the external device utilizing an external device protocol handler; and converting information from the device-specific format utilized by the external device to the standard format utilized by the EMS utilizing an external device content handler.

3. The method of efficiently interfacing an EMS with an external device of claim 1 further comprising the step of providing the information to an external viewer in a suitable manner utilizing a display handler.

4. The method of efficiently interfacing an EMS with an external device of claim 3 wherein the step of providing the information to an external viewer in a suitable manner includes the steps of:

registering a class and location for each display handler in the information repository;

when an unknown event arrives at the boundary component, determining whether the event's content type matches any registered display handlers in the information repository;

sending the class and location of a matching display handler from the information repository to the boundary component; and utilizing the display handler to providing the information to the external viewer in a suitable manner.

5. The method of efficiently interfacing an EMS with an external device of claim 3 wherein the step of providing the information to an external viewer in a suitable manner includes the steps of:

adding a display handler location field to alarm events handled by the EMS;

when an unknown event arrives at the boundary component, determining by the boundary component, the location of the display handler for the event from the display handler location field; and utilizing the display handler to providing the information to the external viewer in a suitable manner.

* * * * *